US009612689B2

(12) United States Patent
Harrison et al.

(10) Patent No.: US 9,612,689 B2
(45) Date of Patent: Apr. 4, 2017

(54) METHOD AND APPARATUS FOR CLASSIFYING A TOUCH EVENT ON A TOUCHSCREEN AS RELATED TO ONE OF MULTIPLE FUNCTION GENERATING INTERACTION LAYERS AND ACTIVATING A FUNCTION IN THE SELECTED INTERACTION LAYER

(71) Applicant: QEEXO, CO., San Jose, CA (US)

(72) Inventors: Chris Harrison, Pittsburgh, PA (US); Julia Schwarz, Pittsburgh, PA (US); Leandro Damian Zungri, Ciudad Autonoma de Buenos Aires (AR)

(73) Assignee: Qeexo, Co., Mountain View, CA (US)

( * ) Notice: Subject to any disclaimer, the term of this patent is extended or adjusted under 35 U.S.C. 154(b) by 0 days.

(21) Appl. No.: 14/751,589

(22) Filed: Jun. 26, 2015

(65) Prior Publication Data
US 2016/0224145 A1    Aug. 4, 2016

Related U.S. Application Data

(63) Continuation-in-part of application No. 14/612,089, filed on Feb. 2, 2015.

(51) Int. Cl.
*G06F 3/043* (2006.01)
*G06F 3/041* (2006.01)
(Continued)

(52) U.S. Cl.
CPC ............ *G06F 3/043* (2013.01); *G06F 3/0416* (2013.01); *G06F 3/0482* (2013.01); *G06F 3/0488* (2013.01); *G06F 3/04842* (2013.01)

(58) Field of Classification Search
CPC ...... G06F 3/041; G06F 3/0412; G06F 3/0414; G06F 3/0416; G06F 3/042; G06F 3/0421; G06F 3/0425; G06F 3/0428; G06F 3/043; G06F 3/0433; G06F 3/0436; G06F 3/044; G06F 3/045; G06F 3/046; G06F 3/047; G06F 3/048; G06F 3/0481; G06F 3/0482;
(Continued)

(56) References Cited

U.S. PATENT DOCUMENTS 6,933,930 B2 * 8/2005 Devige ................. G06F 3/0433
178/18.04
9,013,452 B2 * 4/2015 Harrison ............... G06F 3/0488
345/177
(Continued)

*Primary Examiner* — Tom Sheng
(74) *Attorney, Agent, or Firm* — David N. Tran; IPV Law Group

(57) ABSTRACT

A system for classifying touch events of different interaction layers includes a touch screen configured to display an interactive element, one or more vibro-acoustic sensors coupled to the touch screen, a touch event detector configured to monitor the one or more vibro-acoustic sensors and to save vibro-acoustic signals sensed by the one or more vibro acoustic sensors, wherein the touch event detector is further configured to detect touch events in which the interactive element is touched by a first or a second finger part of a user, and wherein the touch events result in generating the vibro-acoustic signals, and a vibro-acoustic classifier is configured to classify the vibro-acoustic signals and activate corresponding functions in the different layers dependent upon which finger part is used.

24 Claims, 18 Drawing Sheets

(51) Int. Cl.
*G06F 3/0488* (2013.01)
*G06F 3/0482* (2013.01)
*G06F 3/0484* (2013.01)

(58) Field of Classification Search
CPC ............... G06F 3/0484; G06F 3/04842; G06F 3/04845; G06F 3/04847; G06F 3/0485; G06F 3/0486; G06F 3/0487; G06F 3/0488; G06F 3/03547
See application file for complete search history.

(56) References Cited

U.S. PATENT DOCUMENTS

| | | | |
|---|---|---|---|
| 2003/0217873 A1* | 11/2003 | Paradiso | G06F 3/0433 178/18.04 |
| 2010/0225601 A1* | 9/2010 | Homma | G06F 3/0416 345/173 |
| 2010/0279738 A1* | 11/2010 | Kim | G06F 3/016 455/566 |
| 2011/0018825 A1* | 1/2011 | Kondo | G06F 3/0433 345/173 |
| 2011/0141066 A1* | 6/2011 | Shimotani | G01C 21/3664 345/177 |
| 2011/0248927 A1* | 10/2011 | Michaelis | G06F 3/04845 345/173 |
| 2015/0293592 A1* | 10/2015 | Cheong | G06F 3/016 345/173 |
| 2016/0018942 A1* | 1/2016 | Kang | G06F 3/0488 345/173 |
| 2016/0117015 A1* | 4/2016 | Veneri | B81B 7/0045 345/174 |

* cited by examiner

METHOD AND APPARATUS FOR CLASSIFYING A TOUCH EVENT ON A TOUCHSCREEN AS RELATED TO ONE OF MULTIPLE FUNCTION GENERATING INTERACTION LAYERS AND ACTIVATING A FUNCTION IN THE SELECTED INTERACTION LAYER

CROSS-REFERENCE TO RELATED APPLICATION

This application is a continuation-in-part of application Ser. No. 14/612,089 filed on Feb. 2, 2015 having the title METHOD AND APPARATUS FOR CLASSIFYING FINGER TOUCH EVENTS ON A TOUCHSCREEN which is in turn a continuation of U.S. Pat. No. 9,013,452 filed on Mar. 25, 2013 having the title "METHOD AND SYSTEM FOR ACTIVATING DIFFERENT INTERACTIVE FUNCTIONS USING DIFFERENT TYPES OF FINGER CONTACTS."

TECHNICAL FIELD

The present invention relates to classifying touch events, and more particularly, to a method and system for classifying touch event and vibro-acoustic signals to identify a finger part used to touch an interactive element displayed on a touch screen and treating the touch event so classified as meant to activate a function or functions in a traditional application layer, a gestures layer or an auxiliary action layer.

BACKGROUND

Contemporary interactive surfaces generally treat finger touches as a single class of input. However, this is a gross simplification—fingers are diverse appendages, both in their motor capabilities and their anatomical composition. Supporting additional dimensions of finger input have largely been ignored because instrumenting the user with active or passive components is invasive.

At present, in order for a finger to perform different operations at a single point in space on a touch screen, it must be overloaded (e.g., in time or space). Most common is a tap-and-hold period, or chording of the fingers (e.g., two-finger-tap for right click). This can trigger a transient contextual menu, which allows a user to select one of several actions. An alternative to finger overloading is breaking function out into one or more buttons. For example, there is a scheme in which one button is for minimizing a window and another button is for closing it. However, this is problematic for mobile devices with limited screen real estate.

Currently, touch screens do not distinguish between different types of finger contacts. For example, touching with the tip of the finger and touching with the knuckle are treated the same. As such, all finger touches have the same interactive outcome. Also, currently, touch screen interfaces generally pass input events (e.g. finger touches) directly through to running applications. For example, a finger press on an application icon that is visible on the touchscreen launches it. As such, all finger touches have interactions with only one interaction layer, for example, with the layer of running application(s) that has (have) software buttons or other widgets, or icons that are visible on the touch screen.

SUMMARY

In view of the above, embodiments of the present invention provide a method and system for activating functions in different interactive layers based on a classification of vibro-acoustic and touch signals. In accordance with an aspect of the present invention, there is provided a system for classifying touch events, the system comprises a touch screen configured to display an interactive element; one or more vibro-acoustic sensors (i.e., mechanical vibrations and/or sound) operating inside a computing device (e.g., coupled to the touch screen, chassis, mainboard PCB, daughterboard, etc.); a touch event detector configured to monitor user touch events and capture associated data; one or more vibro-acoustic sensors and to capture, save and/or buffer vibro-acoustic signals sensed; wherein the touch event detector is further configured to detect touch events in which the interactive element is touched by a first or a second finger part of a user, and wherein the touch events result in generating the vibro-acoustic and touch signals; and a classifier configured to classify the vibro-acoustic and touch signals. Such classification is then used to treat touch events as related to different function generating interaction layers depending on which finger part was used to create the touch event. For example, the fingertip or finger pad may be used to activate functions in a traditional application layer to launch an application or drag an icon, while the knuckle or nail may be used to access an entirely separate function generating layer such as functions triggered by gestures. In this example, the gestures layer may not have visible icons on the touch screen. For example, a "C" gesture made on the touchscreen by a user by using his/her knuckle or fingernail would launch a camera application and not at all affect the running application (e.g. email) that is visible on the touchscreen.

BRIEF DESCRIPTION OF THE DRAWINGS

The above and other objects and features of the present invention will become apparent from the following description of an exemplary embodiment given in conjunction with the accompanying drawings, in which like reference numerals are used to refer to like elements throughout, and in which.

DETAILED DESCRIPTION

The advantages and features of exemplary embodiments and methods of accomplishing these will be clearly understood from the following embodiments taken in conjunction with the accompanying drawings. However, the exemplary embodiments are not limited and may be implemented in various forms. It should be noted that the exemplary embodiments are provided to make a full disclosure and also to allow those skilled in the art to understand the full range of the exemplary embodiments. Therefore, the exemplary embodiments are to be defined only by the scope of the appended claims.

FIGS. 1A to 4B are exemplary diagrams illustrating a concept of activating different interactive functions based on a classification of touch and vibro-acoustic signals in accordance with an exemplary embodiment of the present invention;

In brief, a concept of the present invention may be described as follow. A user touches or contacts a touch screen with one of the finger parts, e.g., a fingertip. Such a touch event triggers a primary or conventional functionality, such as opening a file, dragging a file, launching an application, selecting a song, pressing a button, and the like. When a user touches the touch screen with another one of the finger parts, e.g., a knuckle or fingernail, an auxiliary function is launched on the same touch screen.

Although one or more exemplary embodiments explain and illustrate that a fingertip causes to activate a primary function and a knuckle or fingernail causes to activate an auxiliary function, the embodiments do not limit thereto. It should be noted that different combination of these finger parts or the use of other finger parts can also activate the primary and auxiliary functions.

Figure 1A:
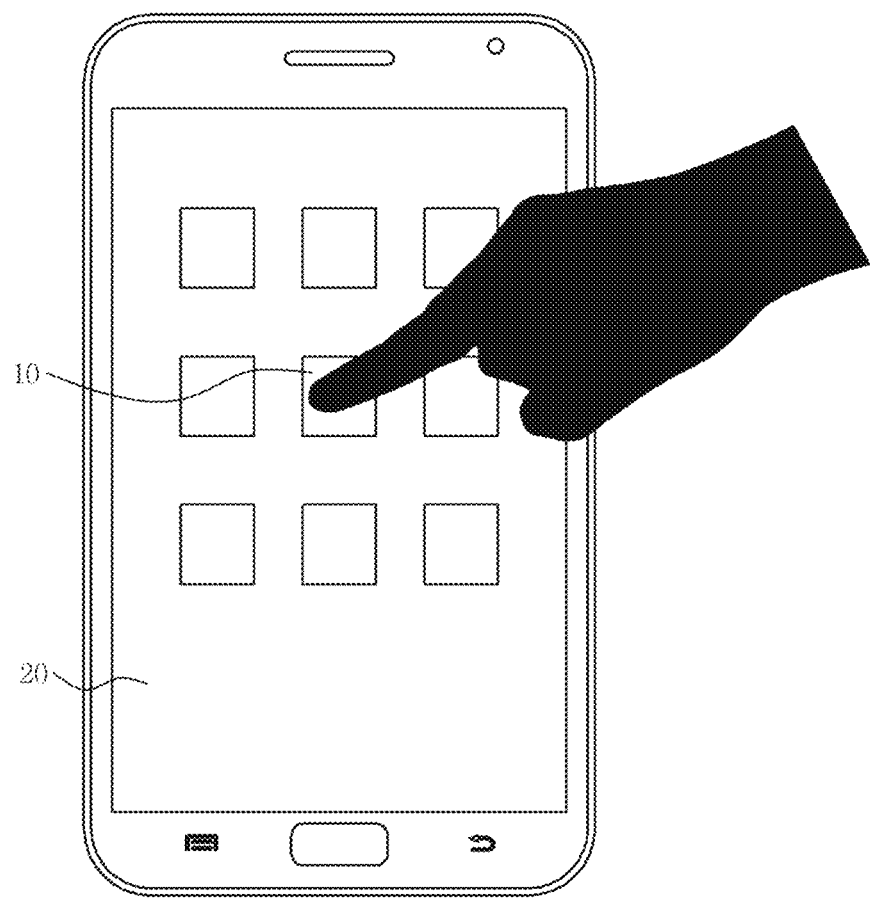
FIGS. 1A to 4B are exemplary diagrams illustrating a concept of activating different interactive functions based on a classification of touch and vibro-acoustic signals in accordance with an exemplary embodiment of the present invention.

First, FIG. 1A illustrates one exemplary diagram that a fingertip is used to trigger a primary or conventional function.

As shown in FIG. 1A, when a user touches an interactive element 10 on a touch screen 20 with a fingertip, a primary or conventional function is triggered. The term of "interactive element" used herein may refer to a user interface such as an icon or a graphical object representing applications or services designed to activate a specific function related thereto. The specific function, for example, may include such actions opening, dragging, launching, selecting, or pressing a photo, a file, a text, an image, an application, a song, a button, a game, an in-game character or the like through the use of the applications or services.

Figure 1B:
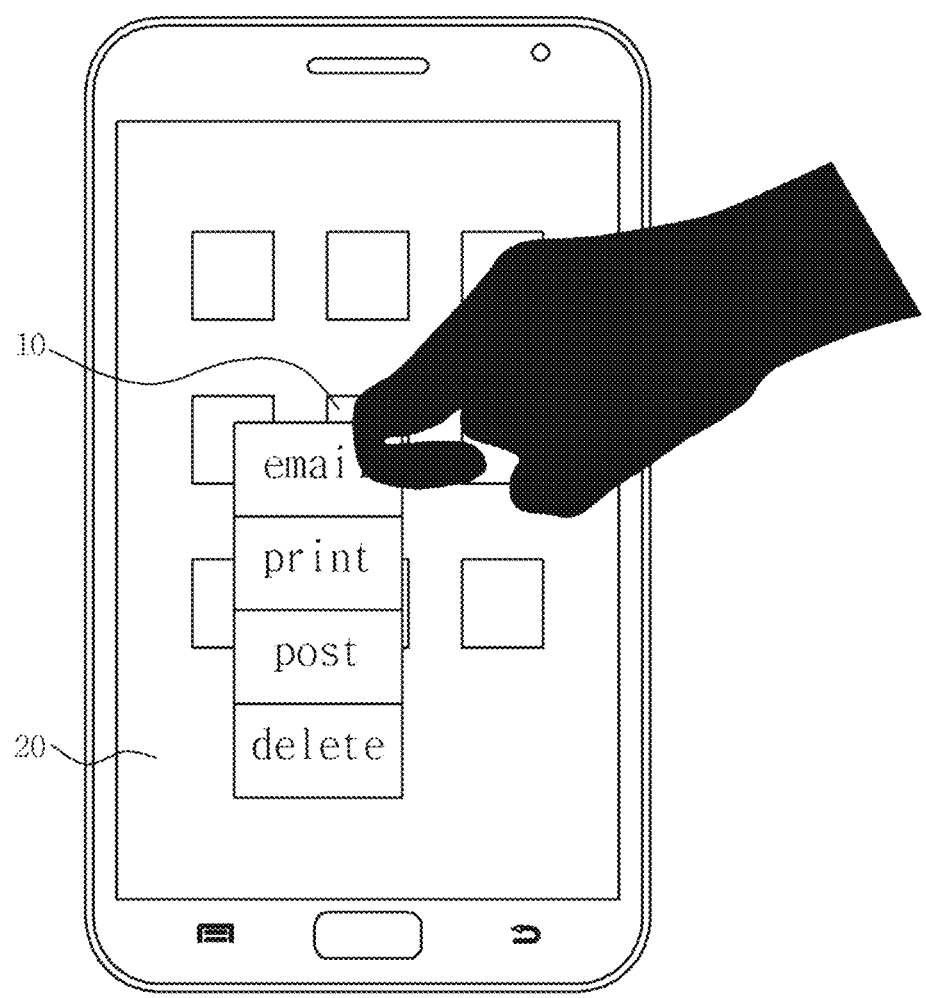
Figure 1C:
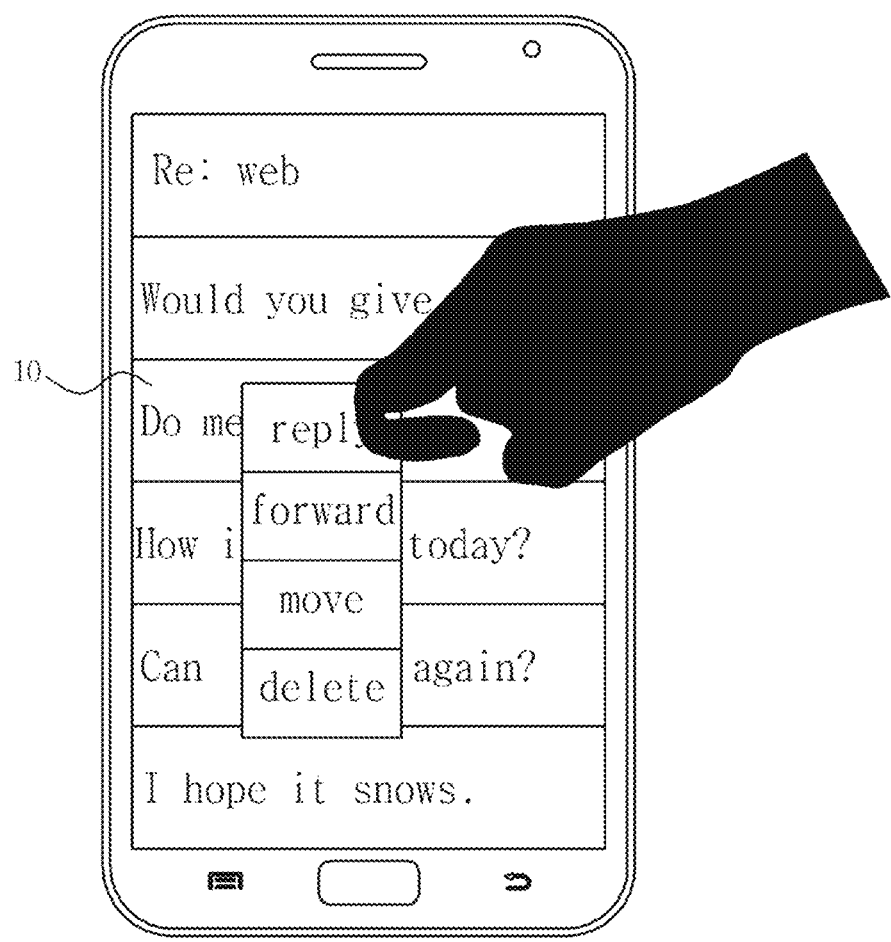

FIGS. 1B and 1C illustrate exemplary diagrams that a knuckle or fingernail is used to activate an auxiliary function such as a pop-up of context menus.

Referring to FIG. 1B, a fingertip may be used to scroll (i.e., translate a display window) as seen in contemporary touch interfaces. When a knuckle or fingernail touches an interactive element 10 on a touch screen 20, e.g., a photo, a contextual pop-up menu could appear with the following options: email, print, post, delete and the like. As another example, as shown in FIG. 1C, when a knuckle or fingernail touches an interactive element 10, e.g., an opened email, a context menu could appear with the following options: reply, forward, move, delete, and the like.

Figure 2A:
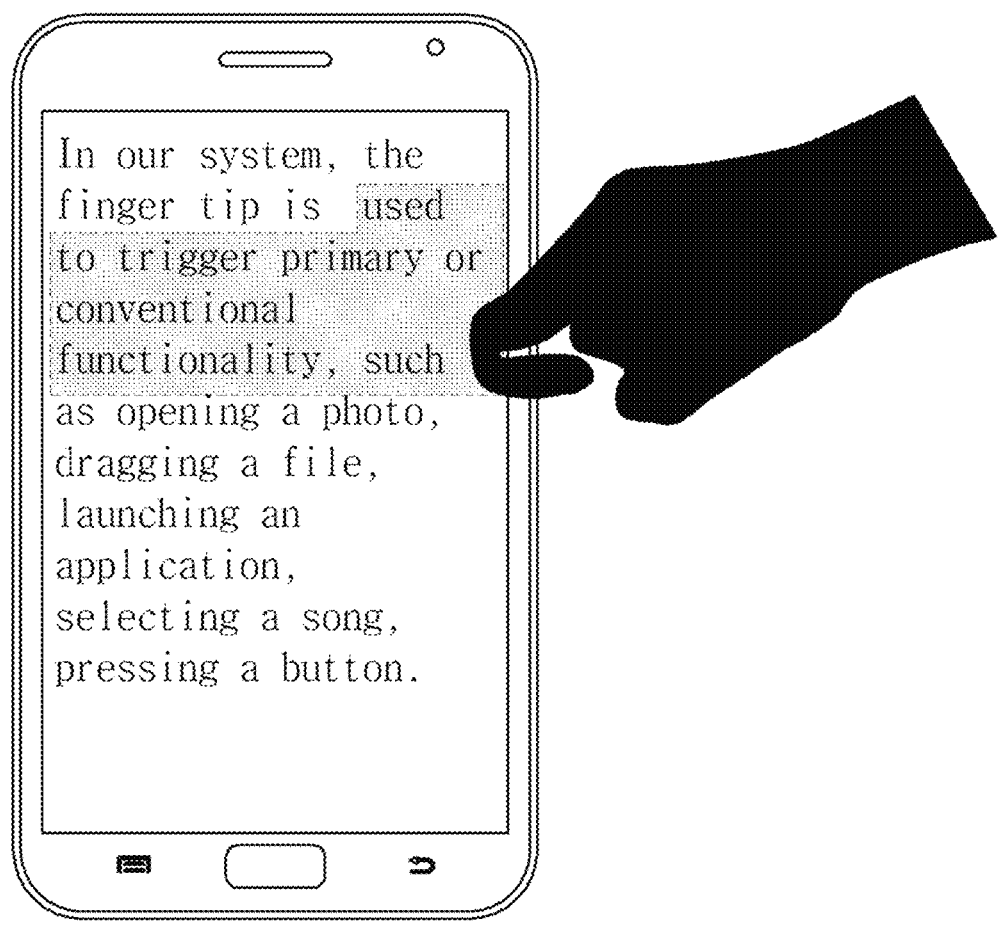
Figure 2B:
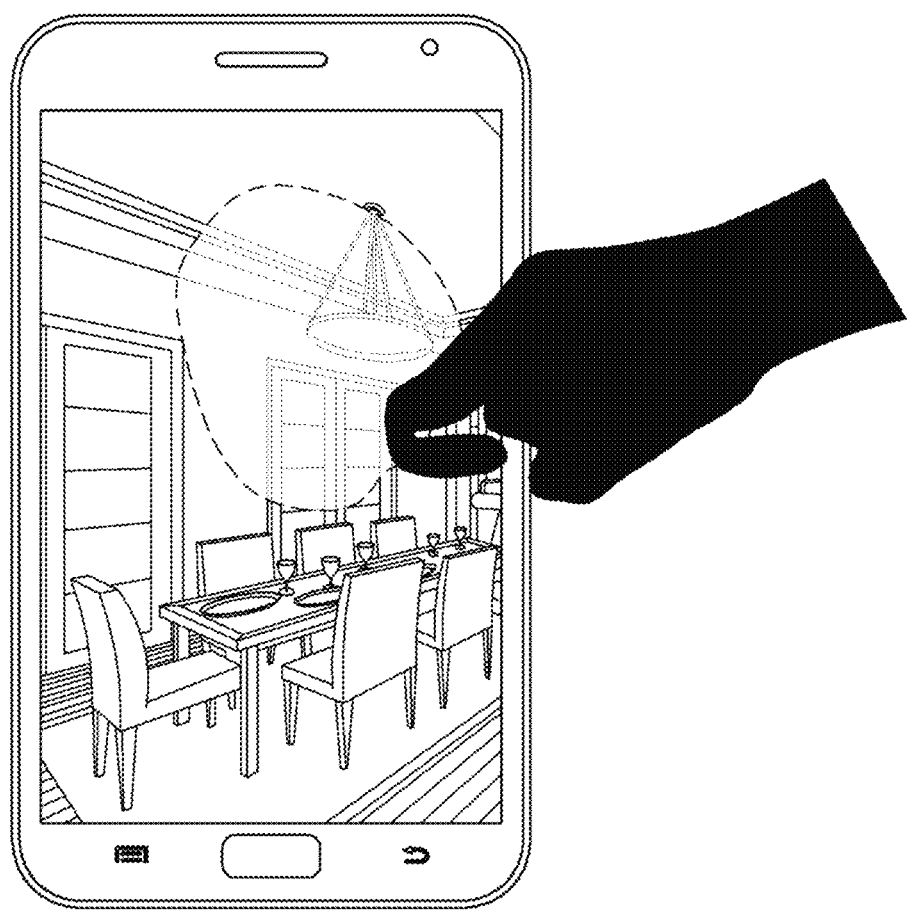
Figure 2C:
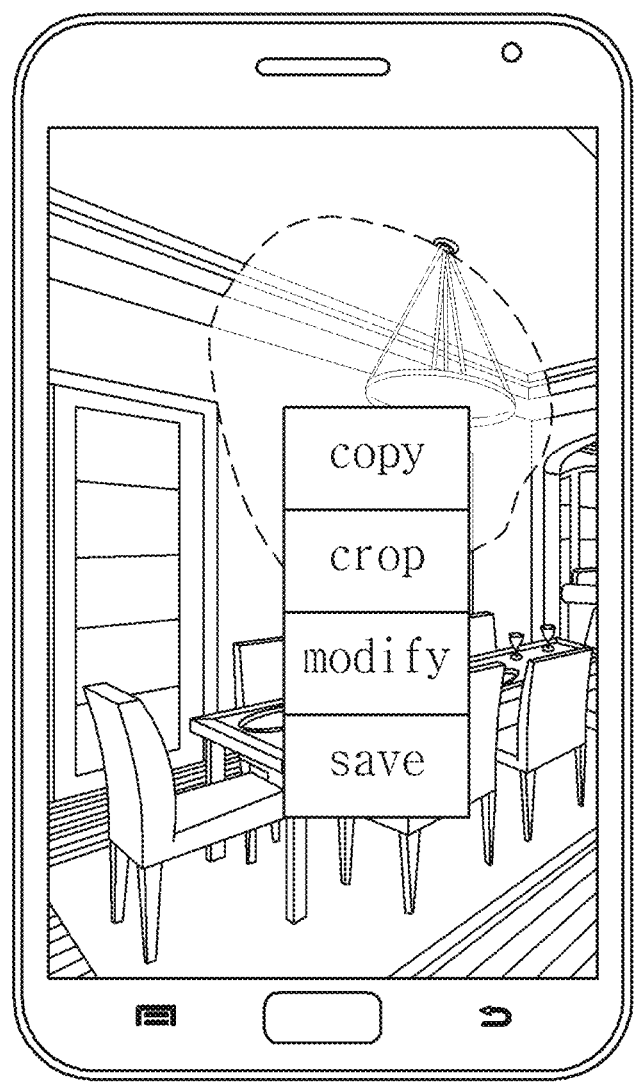

FIGS. 2A, 2B and 2C illustrate exemplary diagrams that the knuckle or fingernail can be used for interactions requiring selection.

In FIG. 2A, one exemplary embodiment includes a selection of text. A fingertip may be used to scroll (i.e., translate a display window) as seen in contemporary touch interfaces. Using a knuckle or fingernail, a user may touch and drag over a region of text to select the text. As another example, using a knuckle or fingernail, a user may touch and drag over a region of text to paint the text in a special color (e.g., a highlighting tool).

In FIG. 2B, using a knuckle or fingernail, a user may touch and drag over a region of an image to lasso select an arbitrary shaped sub-region of the image or a user may touch and drag over a region of an image to select a rectangular sub-region of the image. Finally, upon completion of this selection action, a context menu could automatically appear. For example, as illustrated in FIG. 2C, following an image region selection, a context menu could appear with the following options: copy, crop, modify, save, etc. As another example, following a text selection, a context menu could appear with the following options: copy, cut, paste, search, delete, etc.

Figure 3A:
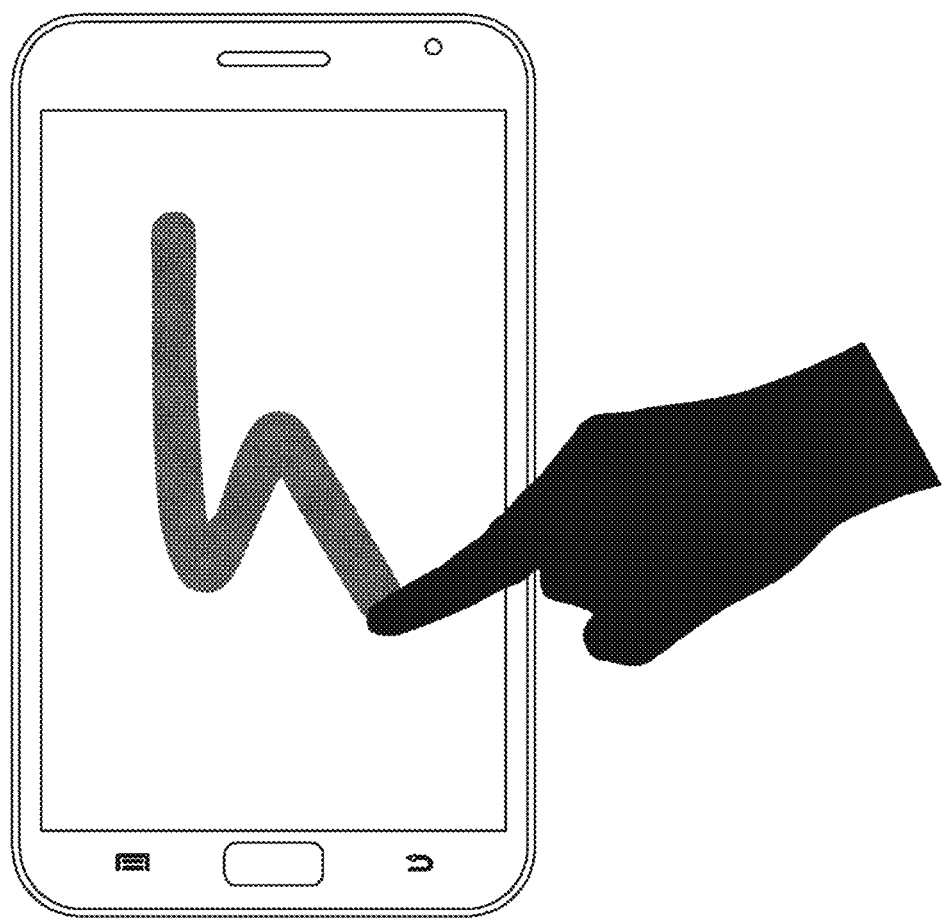
Figure 3B:
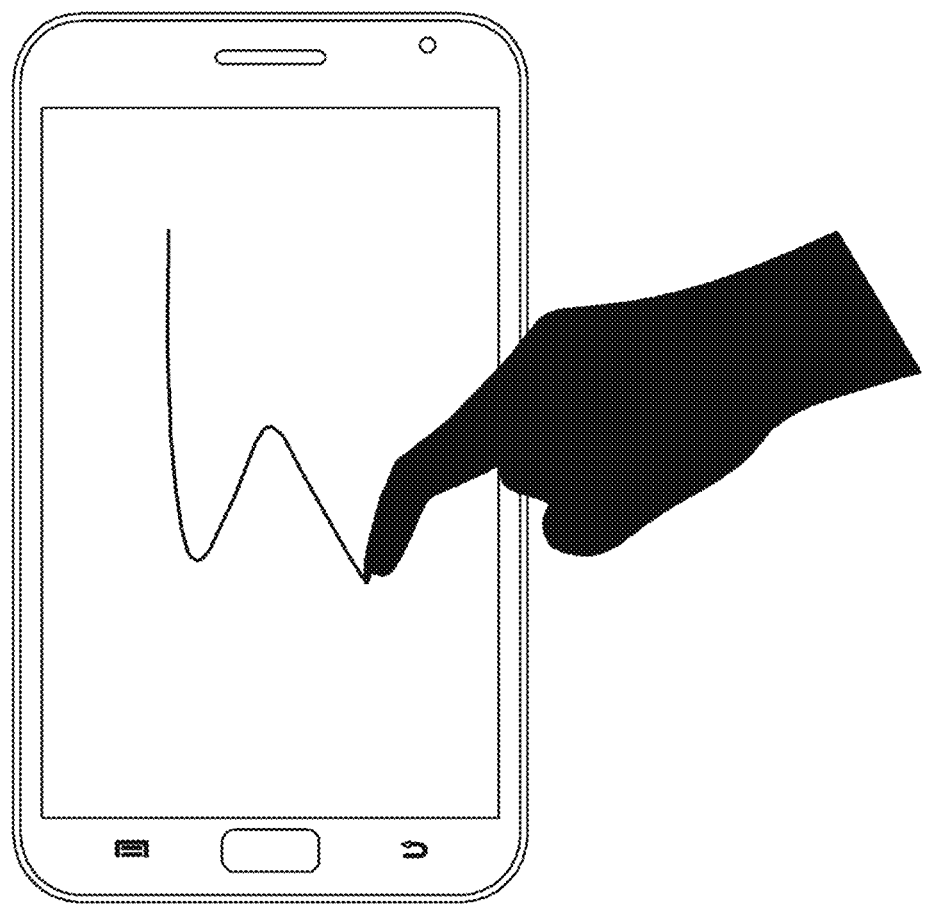
Figure 3C:
Figure 3D:
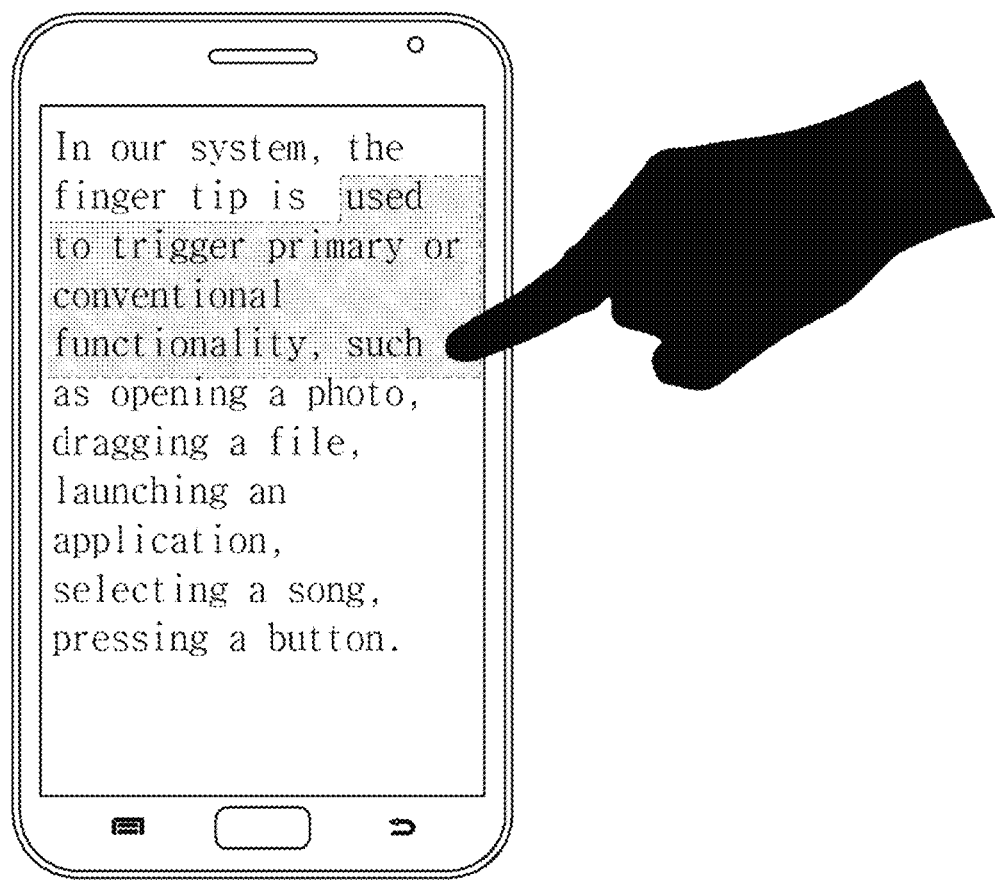
Figure 3E:
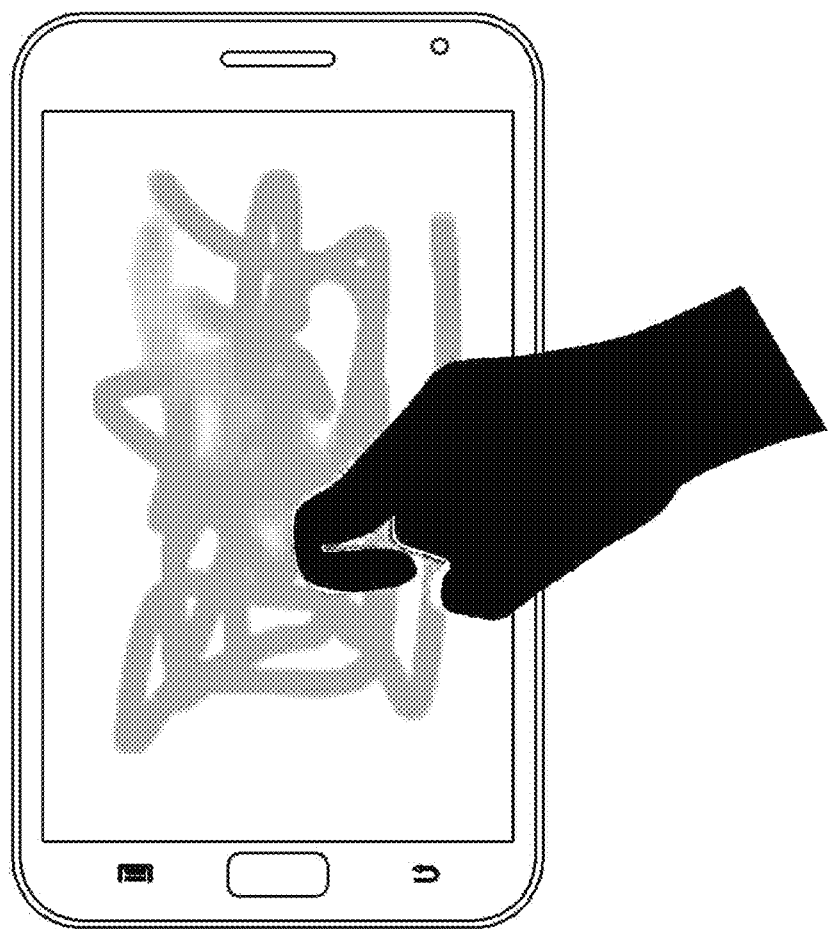

FIGS. 3A to 3E illustrate exemplary diagrams in which touches with the finger tip, knuckle and fingernail are used for different drawing actions in a drawing mode. In exemplary embodiment, the finger parts of the user are used as tools for different drawing actions in the drawing mode. For example, the fingertip may be used as a thick brush, the fingernail or knuckle as a fine marker, and the knuckle for erasing, as illustrated in FIGS. 3A, 3B, and 3C, respectively. Another exemplary configuration includes using the fingertip as a marker for highlighting the selected text region and the knuckle for smudging, as illustrated in FIGS. 3D and 3E, respectively.

Figure 4A:
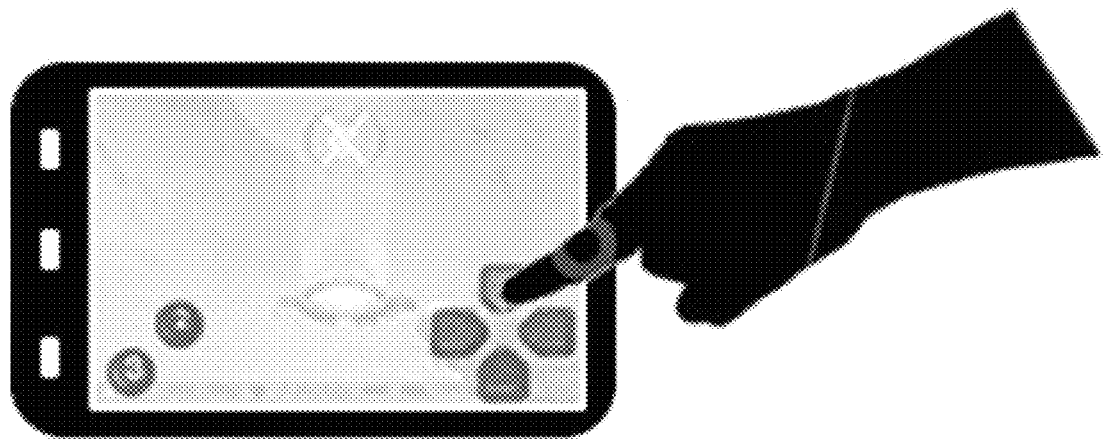
Figure 4B:
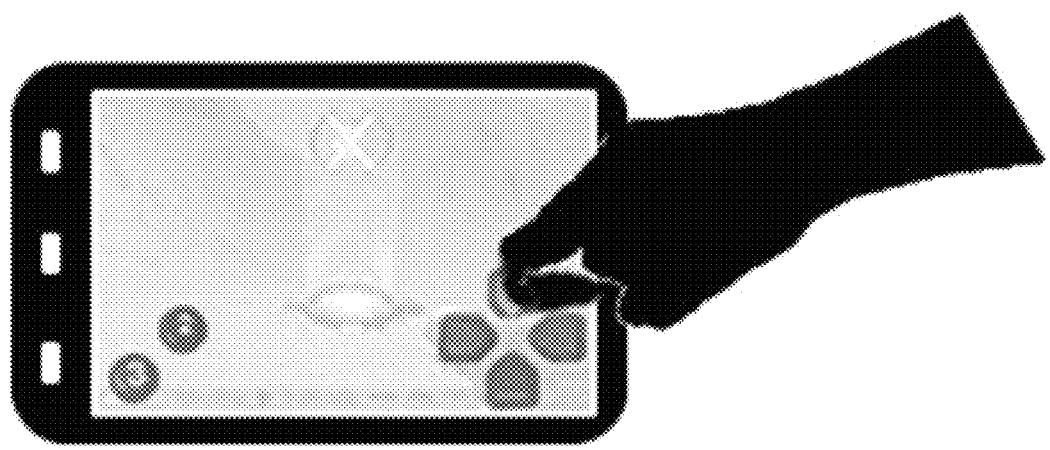

FIGS. 4A and 4B illustrate exemplary diagrams that the touches with the knuckle and fingernail can be used for auxiliary actions in games in concert with fingertip driven interactions.

As illustrated in FIG. 4A, using an onscreen movement control (e.g., virtual joy stick or arrow pad), a fingertip may be used for regular in-game character (i.e., player) movement. If a knuckle or fingernail is used, as illustrated in FIG. 4B, the directional player movement may be performed in a crouched position. As another example, a fingertip may be used for a primary weapon fire and a knuckle or fingernail for alternative weapon mode. Also, a touch with a fingernail may be used to run. In addition, a momentary tap of the knuckle or fingernail (i.e., a tap) may be used to jump an in-game character.

Figure 5:
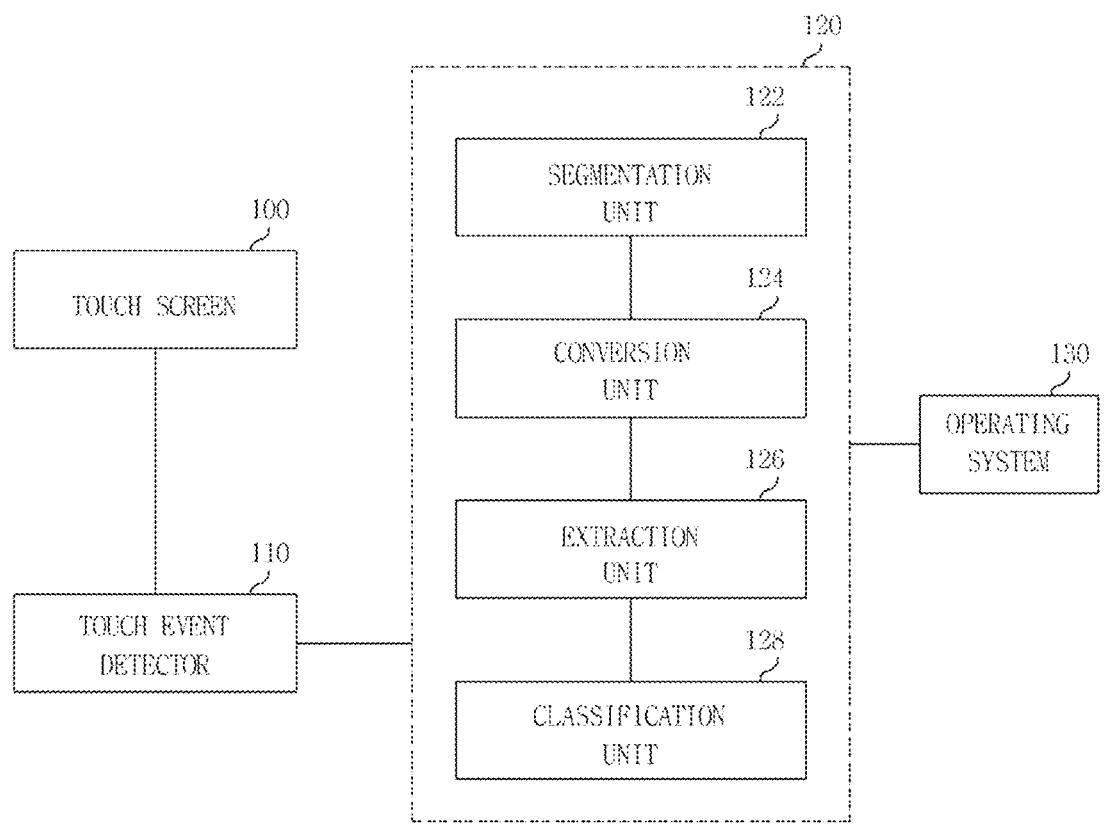
FIG. 5 is a block diagram of a computing system for activating different interactive functions based on a classification of touch and vibro-acoustic signals in accordance with an exemplary embodiment of the present invention.

FIG. 5 is a block diagram of a computing system for distinguishing different interactive functions based on a classification of touch and vibro-acoustic signals in accordance with an embodiment of the present invention.

The computing system of the embodiment may have an operating system (OS), and can run various types of services or applications, known as apps. The computing system may also be equipped with a telecommunication capability that can allow connections to communication network. Such a computing system may include, but not limited to, a table top computer (e.g., Surface Computing), laptop computer, desktop computer, mobile computer, mobile internet device, mobile phone, smart-phone, PDA (Personal Digital Assistant), game console, portable media player, and the like.

Referring to FIG. 5, the computing system includes a touch screen 100, a touch event detector 110, a touch and vibro-acoustic classifier 120, and an OS 130.

Figure 6:
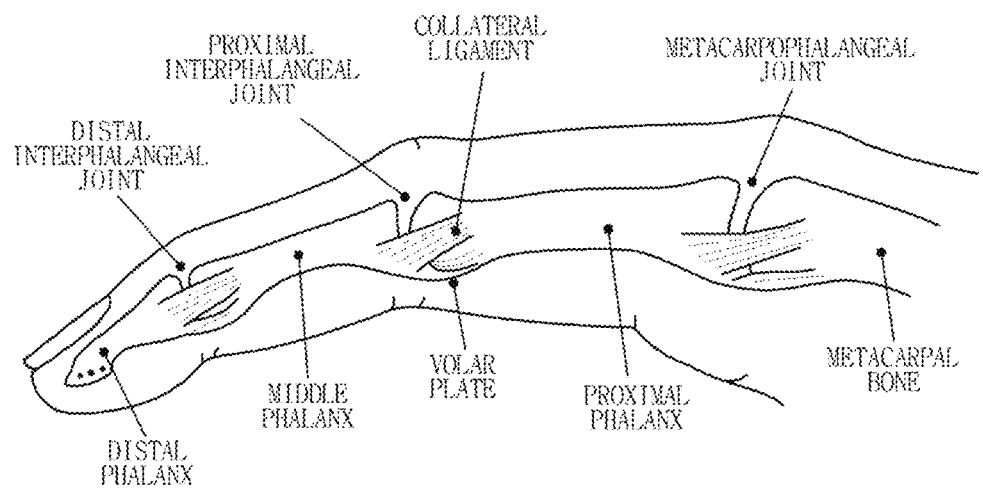
FIG. 6 illustrates an anatomical chart of finger parts for use in interacting with the computing system in accordance with an exemplary embodiment of the present invention.

The touch screen 100 is an electronic visual display and serves also an input/output device supplementing or substituted for a keyboard, a mouse, and/or other types of devices. The touch screen 100 displays one or more interactive elements such as graphical representation for services or applications designed to perform a specific function on the computing system. Touching the interactive elements with the finger parts of a user, beyond the conventional tip of the finger, causes the OS 130 to activate the application or service related to the interactive elements. As shown in FIG. 6, fingers are diverse appendages, both in their motor capabilities and their anatomical compositions. A single digit contains different parts such as one or more knuckles, a tip, pad, and fingernail.

The fingertip includes the fleshy mass on the palmar aspect of the extremity of the finger, as well as the finger sides up to the distal interphalangeal articulation. It also includes the very tip of the finger (i.e., the distal tip of the distal phalanx). However, the fingernail may not be included in an embodiment as part of fingertip definition, as this is an anatomically distinct feature and region.

The fingernail encompasses all parts of the keratin (or artificial nail material), horn-like envelope covering the dorsal aspect of the terminal phalanges of fingers. The knuckle includes the immediate areas surrounding the boney joints of human fingers, including joints on the thumb, and both major and minor knuckles. Specifically, the boney regions are within a 1 cm radius surrounding the metacarpophalangeal joints and interphalangeal articulations.

Figure 7:
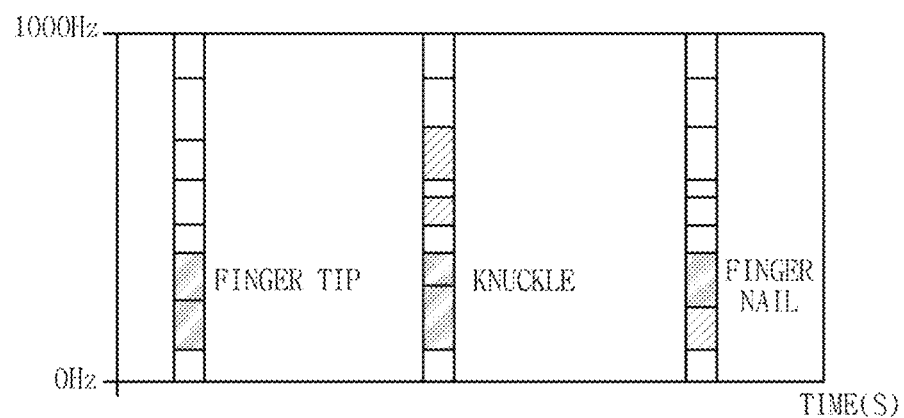
FIG. 7 shows a spectrogram of finger parts in accordance with an exemplary embodiment of the present invention.

When an object strikes a certain material, vibro-acoustic waves propagate outward through the material or along the surface of the material. Typically, interactive surfaces use rigid materials, such as plastic or glass, which both quickly distribute and faithfully preserve the signal. As such, when respective finger parts touch or contact the surface of the touch screen 100, vibro-acoustic responses are produced. The vibro-acoustic characteristics of the respective finger parts are unique, mirroring their unique anatomical compositions. For example, FIG. 7 illustrates a spectrogram of three types of the finger contact. As known from FIG. 7, the finger parts, that is, a fingertip, a knuckle, and a fingernail, produce different vibro-acoustic responses.

When a user wants to use an application or a service on the computing system, the user may touch an interactive element for the application or service with a finger part such as a fingertip, knuckle, or fingernail. Such a touch event results in the generation of a unique vibro-acoustic signal from the surface of the touch screen 100.

Referring back to FIG. 5, the touch event detector 110 detects the touch event entailing the vibro-acoustic signal. The touch event detector 110, for example, may be arranged at a rear side of the touch screen so that the vibro-acoustic signal caused by the touch event can be captured. The touch event detector 110 can be triggered by the onset of the vibro-acoustic signal resulting from the touch event. To capture the touch event and subsequent vibro-acoustic signal, the touch event detector 110 may include one or more impact sensors, vibration sensors, accelerometers, strain gauges, or acoustic sensors such as a condenser microphone, a piezoelectric microphone, MEMS microphone and the like. Once the vibro-acoustic signal has been captured by the touch event detector 110, the vibro-acoustic classifier 120 processes the vibro-acoustic signal to distinguish which finger part was used.

The OS 130 runs the computing system so that the primary function or the auxiliary function can be activated in line with the classification of the vibro-acoustic signals.

The vibro-acoustic classifier 120 includes a segmentation unit 122 to segment the vibro-acoustic signal into a digital representation; a conversion unit 124 to convert the digitized vibro-acoustic signal into an electrical signal; a feature extraction unit 126 derive a series of features from the electrical signal; and a classification unit 128 to classify the finger part using the features to distinguish what finger part was used for the touch event.

The segmentation unit 122 samples the vibro-acoustic signal, for example, at a sampling rate of 96 kHz, using a sliding window of 4096 samples of the vibro-acoustic signal. The conversion unit 124 then performs, for example, a Fourier Transform on sampled time-dependent vibro-acoustic signal to produce an electrical signal having frequency domain representation. For example, the Fourier Transform of this window may produce 2048 bands of frequency power.

The vibro-acoustic classifier 120 may further downsample this data into additional vectors (i.e., buckets of ten), providing a different aliasing. In addition, additional time-domain features may be calculated from the vibro-acoustic signal, such as the average absolute amplitude, total absolute amplitude, standard deviation of the absolute amplitude, the center of mass for both the segmented input signal and the Fourier Transformed signal, and zero crossings.

The feature extraction unit 126 may also calculate a series of features from the frequency domain representation of the vibro-acoustic signals, such as the fundamental frequency of the impact waveform.

The classification unit 128 classifies the vibro-acoustic signal using the features to distinguish what finger part was used to generate the touch event, so that the computing system to selectively activate a primary function or an auxiliary function related to the interactive element depending on the classified vibro-acoustic signals.

To aid classification, the user can provide supplemental training samples to the vibro-acoustic classifier 120.

In one exemplary embodiment, the classification unit 128 may be implemented with a support vector machine (SVM) for feature classification. The SVM is a supervised learning model with associated learning algorithms that analyze data and recognize patterns, used for classification and regression analysis.

Various other apparatus, features and methods for carrying out such processing and classification, are disclosed in other pending applications of the assignee hereof. By way of example, U.S. patent application Ser. No. 14/191,329 entitled "Using Capacitive Images for Touch Type Classification" filed on Feb. 26, 2014, is one such prior application the content of which is hereby incorporated by reference as if fully set forth hereon.

Figure 8:
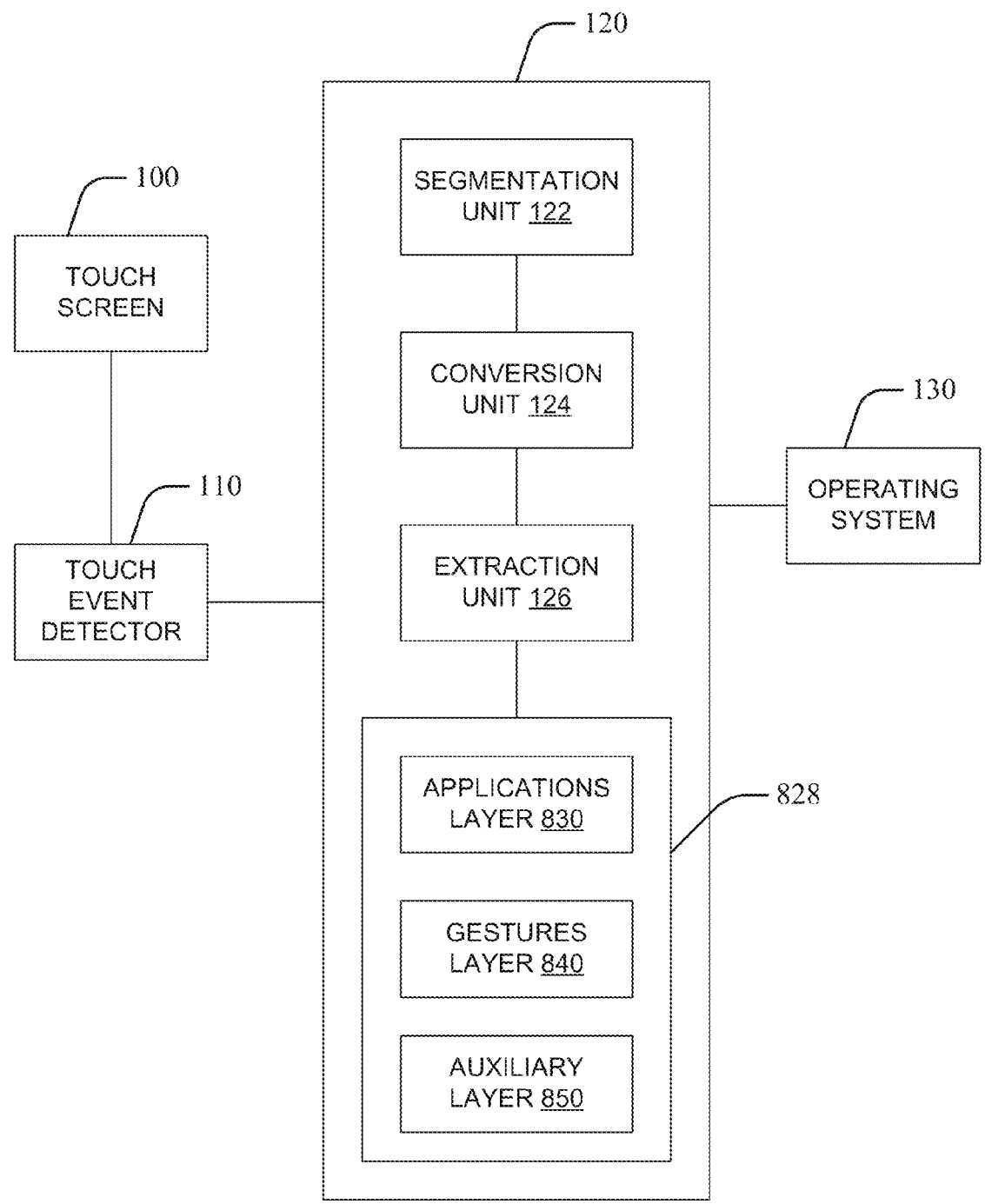
FIG. 8 is a block diagram of a computing system for identifying an interaction layer and activating one or more interactive functions in that layer based on a classification of touch and vibro-acoustic signals in accordance with an exemplary embodiment of the present invention.

FIG. 8 illustrates a block diagram of a computing system for identifying a function generating interaction layer and activating one or more interactive functions in that layer based on a classification of vibro-acoustic signals, in accordance with an exemplary embodiment of the present invention. The computing system of FIG. 8 uses many of the same components that are used by the computing system of FIG. 5. The computing system of FIG. 8 includes a classification unit 828 that includes three components, namely the applications layer component 830, the gestures layer component 840 and the auxiliary layer component 850. The classification unit 828 classifies the touch event and the vibro-acoustic signal generated by a user's contact with the touch screen 100, by using the features generated by the feature extraction unit 126, as related to one of the function generating interaction layers components 830, 840 or 850. The selected component 830, 840 or 850 then facilitates the execution of the one or more functions associated with the touch event.

Figure 9:
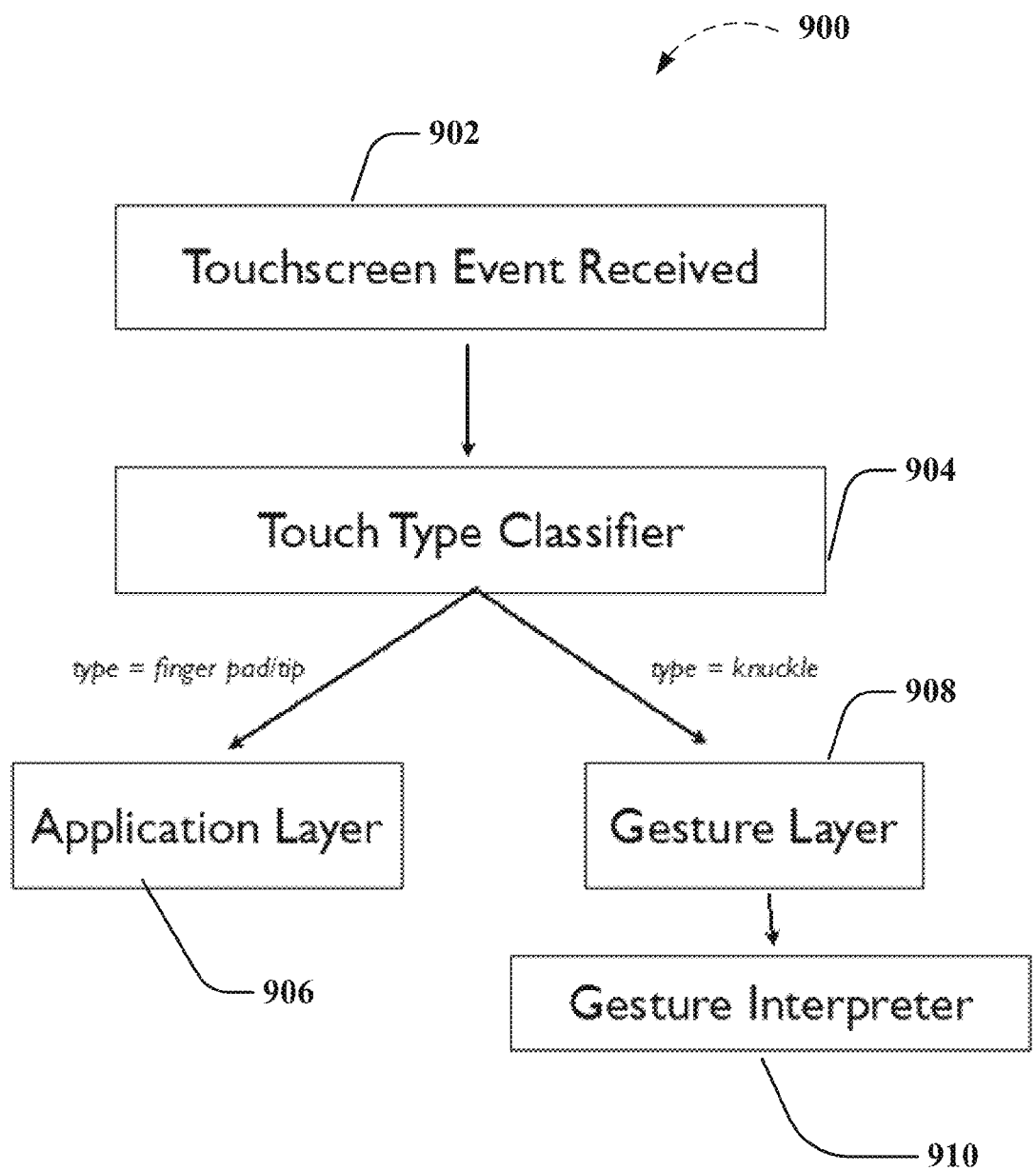
FIG. 9 illustrates an exemplary flow diagram for a method for selection of a function generating interaction layer, according to an aspect of the present invention.

FIG. 9 illustrates a flow diagram 900 of a method that can be implemented by using the computing system of FIG. 8, according to an aspect of the present invention. At 902, a touchscreen event is received. At 904, the touchscreen event is classified according to the touch type. By way of example, if the classifier recognizes that the touch type is a finger pad or tip, it attributes the touch to an application layer such as simple application activation by virtue of touching a corresponding icon (906). However, if the classifier recognizes that that touch type is of a finger knuckle, for example, it attributes the touch to a gesture layer such as a drag path interpreted as a letter corresponding to an entirely separate and distinct action such as camera activation or a non-drag event that has been previously defined by the user such as device audio volume (908). If the gesture layer is selected by the classifier then one or more functions associated with the gesture layer are activated (910).

Figure 10:
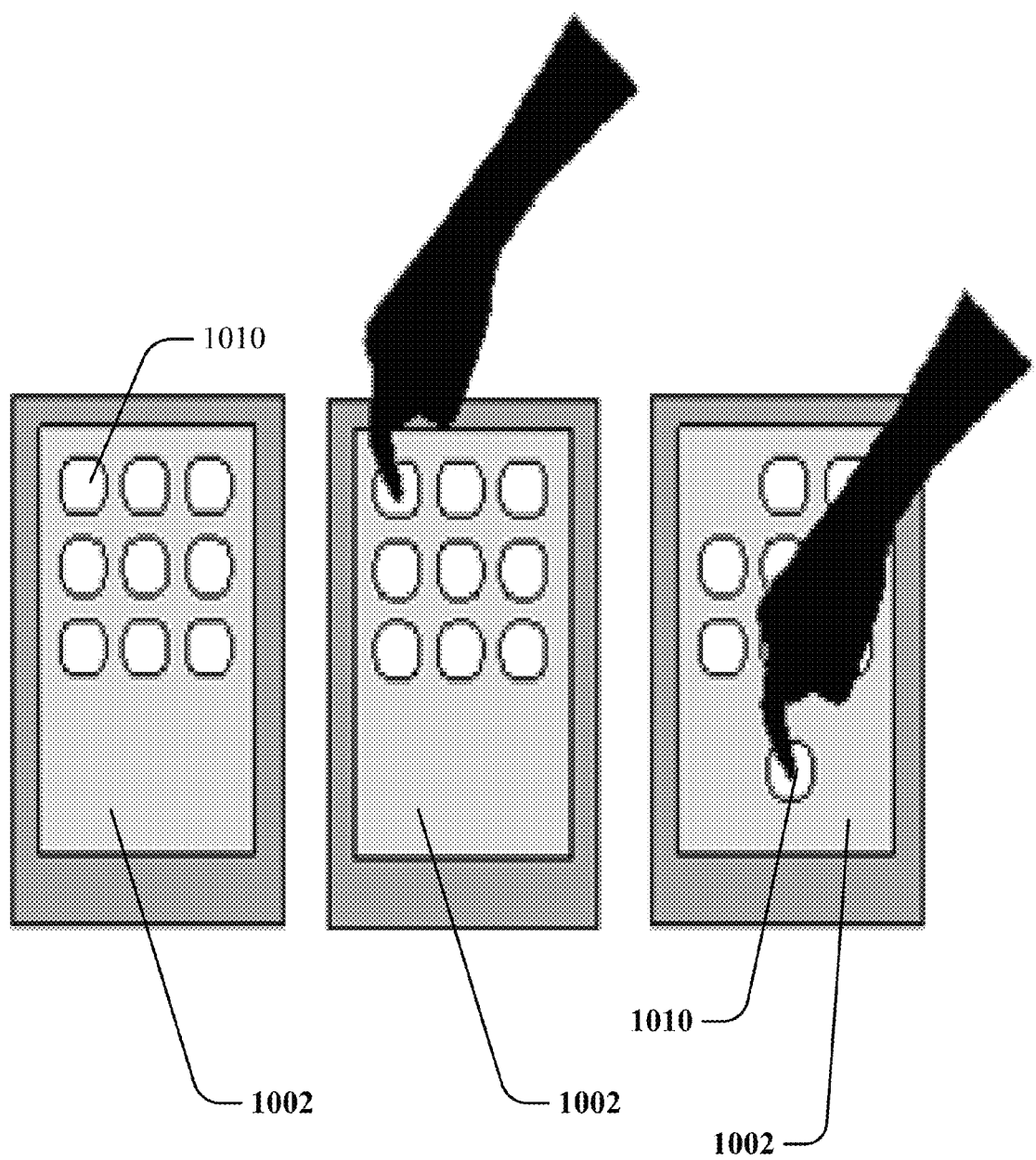
FIG. 10 illustrates an example activation of a function in an application layer caused by a fingertip touch of the touchscreen, according to an aspect of the present invention.

According to an aspect of the subject disclosure, the user may use his/her fingertip, fingernail and knuckle to interact with multiple interaction layers including the conventional application layer (e.g. applications that are running) and other auxiliary layers (e.g. gestures that cannot be accessed by way of visible icons on the touchscreen). Thus, one layer is the traditional application layer and finger tips and pads can as usual interact with it. FIG. 10 illustrates an example of a user's interaction with the conventional application layer. As shown in FIG. 10, the touchscreen 1002 includes icons associated with various applications and the user uses his/her fingertip to change the location of the icon 1010 on the touchscreen 1002. The user is able to drag the icon 1010 with his/her fingertip.

Figure 11:
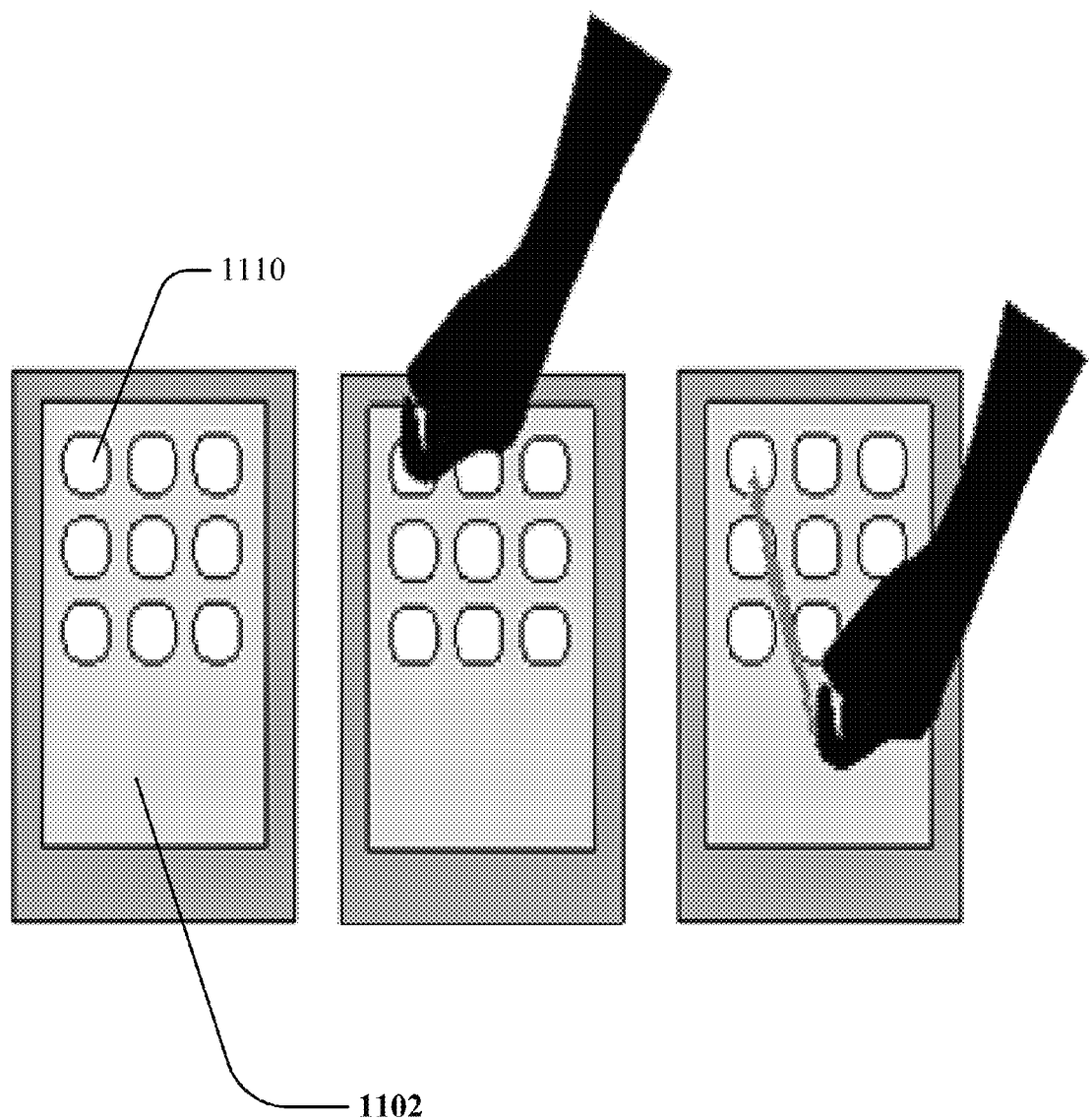
FIG. 11 illustrates that a fingernail touch does not activate functions of an application layer, according to an aspect of the present invention.

However, according to an aspect of the present invention, if a gesture is performed with another part of the finger (e.g., knuckle, nail), the events are retained and used in an entirely separate layer of the interface, and not passed through to a running application. FIG. 11 illustrates an example of a user's interaction with the touchscreen by using his/her fingernail. As shown in FIG. 11, the user is unable to drag the application icon 1110 across the touchscreen 1102 by using his/her knuckle. Thus, according to FIGS. 10 and 11, the user's fingertip interacts with the applications layer and the user's knuckle interacts with a different layer (e.g. a gestures layer) and is ignored by the applications layer. According to an aspect of the present invention, if a knuckle is used, it is interpreted as a gesture. As illustrated in FIG. 11, a mark can be rendered onto the touch screen 1102 that tracks the movement of the knuckle (e.g., a red line).

The following are some examples of gestures, which when performed by a user (e.g. by using a knuckle) are classified as touch events that are not passed to the traditional application layer.

Example 1

The drag path can be interpreted as a letter gesture. For example, dragging a "W" shape with the knuckle can launch the "web browser". Dragging a "S" can put the phone into silent mode. Dragging a "M" can be a gesture for mail and dragging a "J" could call Julia, etc. It is to be appreciates that functions of the gestures layer need not be limited to launching applications. For example, dragging a "C" with a knuckle might launch the camera, take a photo, and post it to social media service (e.g., Instagram).

Example 2

Non-dragging events (e.g., touches) can also be used in the gestures layer. For example, a double tap with the knuckle can also be considered a gesture, for example, to launch the camera.

Example 3

The drag path can be interpreted as a shape. For example, a repeating clockwise circling motion can increase the volume of the device, while a counter clockwise motion can decrease volume. Certain shapes can also launch certain functionality, such as a circle for a quick photo capture. Additionally, a square can be used to simultaneously define and also capture a region of the screen.

All of the above actions can be defined by the user (e.g., "C" gesture can be bound to any option of the user's choosing). The gesture could also be multitouch. For example, two knuckles dragged downward could put the phone into silent mode. The user can also define the roles of various finger parts in interactions with the touchscreen. For example, one of the fingertip, finger nail or the knuckle can be used for interacting with the applications layer and one of the fingertip, finger nail and the knuckle can be used for interacting with the gestures layer.

Additionally, gestures can be application or context specific. For example a 'C' gesture can launch the calendar app at office locations, but a camera app at home or outside. Alternatively, a 'C' gesture could by default launch the Camera app, but when inside of e.g., a painting application, the application can override the system-level gesture, and instead use it to activate a color pallet.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory ("ROM") and random access memory ("RAM").

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While the present invention has been shown and described with respect to the exemplary embodiments, the present invention is not limited thereto. It will be understood by those skilled in the art that various changes and modifications may be made without departing from the scope of the present invention as defined in the following claims.

What is claimed is:

1. A system for classifying finger touch events and generating an event corresponding to one of a plurality of interaction layers, the system comprising:
   a touch screen configured to display interactive elements;
   one or more vibro-acoustic sensors coupled to the touch screen and configured to sense vibro-acoustic signals;
   a touch event detector configured to monitor the onset of user touches;
   a buffer to save vibro-acoustic signals sensed by the one or more vibro acoustic sensors, wherein the touch event detector is further configured to detect touch events in which the touch screen is touched by a first finger part or a second finger part of a user, and wherein the touch events result in generating the vibro-acoustic signals;
   a classifier configured to classify the vibro-acoustic signals;
   a first interaction layer configured to activate a first function responsive to the touch event is by said first finger part touching an interactive element; and
   a second interaction layer configured to activate a second function responsive to the touch event is by said second finger part performing a gesture on the touch screen.

2. The system of claim 1, wherein the first function and the second function are selectively activated based on classification of the vibro-acoustic signals by the classifier and wherein said first and second functions are related to different interaction layers.

3. The system of claim 2, wherein the touch event detector is sensitive to distinguishing signal resulting from touching by said first finger part and from touching by said second finger part.

4. The system of claim 2, wherein a vibro-acoustic sensor is an impact sensor, a vibration sensor, an accelerometer, a gyroscope, a strain gauge, a Piezo electric element, or an acoustic sensor.

5. The system of claim 4, wherein the acoustic sensor is a condenser microphone, a piezoelectric microphone or a MEMS microphone.

6. The system of claim 2, wherein the vibro-acoustic signals saved by the buffer is transmitted to the classifier to enable the classifier to classify the vibro-acoustic signals.

7. The system of claim 6, wherein the classifier is configured to identify whether the first finger part or the second finger part of the user is used to touch the interactive element based on classifying the vibro-acoustic signals.

8. The system of claim 7, wherein the first finger part is a finger tip and the second finger part is a finger knuckle.

9. The system of claim 7, wherein the first finger part is a finger pad and the second finger part is a finger knuckle.

10. The system of claim 7, wherein the first finger part is a finger pad and the second finger part is a finger nail.

11. The system of claim 6, wherein the classifier comprises:
   a segmentation unit configured to convert and segment the vibro-acoustic signals into a digital representation of the vibro-acoustic signals;
   a conversion unit coupled to the segmentation unit and configured to convert the digital representations of the vibro-acoustic signals into electrical signals;
   a feature extraction unit coupled to the conversion unit and configured to derive a series of features from the electrical signals; and
   a classification unit coupled to the feature extraction unit and configured to use the series of features to distinguish whether a finger part used for the touch event is the first finger part or the second finger part.

12. The system of claim 11, wherein the segmentation unit is configured to sample the vibro-acoustic signals using a sliding window of samples of the vibro-acoustic signals.

13. The system of claim 12, wherein the conversion unit is configured to perform a Fourier Transform on the sampled vibro-acoustic signals having time domain representation to generate the electrical signals having frequency domain representation, and wherein the feature extraction unit is configured to calculate a series of features from the frequency domain representation of the electrical signals.

14. The system of claim 1, wherein said first and second finger parts are detected as distinctly different touch events.

15. The system of claim 1, wherein each of said first and second finger parts is a different one of a finger pad, a fingertip, a finger nail, and a finger knuckle.

16. A method for classifying touch events, the method comprising:
   displaying an interactive element of a touch screen;
   monitoring one or more vibro-acoustic sensors coupled with the touch screen to save vibro-acoustic signals sensed by the one or more vibro-acoustic sensors;
   detecting touch events in which the interactive element is touched by a first or a second finger part of a user, wherein the touch events result in generating touch signals;
   classifying the vibro-acoustic signals;
   determining whether the first finger part or the second finger part is used to touch the interactive element on the touch screen based on the classified vibro-acoustic signals; and
   selectively activating a first function from a first interaction layer if the interactive element is touched by the first finger part or a second function from a second interaction layer if a gesture is performed on the touch screen by the second finger part.

17. The method of claim 16, wherein said first and second functions operating in different interaction layers.

18. The method of claim 17, wherein classifying the vibro-acoustic signals comprises:
   segmenting the vibro-acoustic signals into digital representations;
   converting the digital representation of the vibro-acoustic signals into electrical signals; and
   deriving a series of features from the electrical signals.

19. The method of claim 18, wherein said segmenting the vibro-acoustic signals comprises sampling the vibro-acoustic signals using a sliding window of samples of the vibro-acoustic signals.

20. The method of claim 19, wherein converting the digital representation of the vibro-acoustic signals comprises performing a Fourier Transform on sampled vibro-acoustic signals having time domain representation to generate the electrical signals having frequency domain representation.

21. The method of claim 20, wherein said deriving the series of features comprises calculating a series of features from the frequency domain representation of the electrical signals, and distinguishing whether a finger part used for the touch event is the first finger part or the second finger part based on the series of features.

22. The method of claim 16, wherein each of said first and second finger parts is a different one of a finger pad, a fingertip, a finger nail and a finger knuckle.

23. A non-transitory computer readable medium containing instructions for classifying touch events, wherein execution of the program instructions by a processor causes the processor to carry out the steps of:

displaying an interactive element on a touch screen;

monitoring one or more vibro-acoustic sensors coupled to the touch screen to save vibro-acoustic signals sensed by the one or more vibro-acoustic sensors;

detecting touch events in which the touch screen is touched by a first or a second finger part of a user, wherein the touch events result in generating the vibro-acoustic signals;

classifying the vibro-acoustic signals;

determining whether the first finger part or the second finger part is used to touch the touch screen based on said classifying; and activating a first function from a first interaction layer based on the first finger part touching the interactive element, and activating a second function from a second interaction layer based on the second finger part performing a gesture on the touch screen.

24. The computer readable medium of claim 23 wherein the first interaction layer is associated with a running program function, and wherein the second interaction layer a gesture function.

* * * * *

UNITED STATES PATENT AND TRADEMARK OFFICE
CERTIFICATE OF CORRECTION

Page 1 of 1

PATENT NO. : 9,612,689 B2
APPLICATION NO. : 14/751589
DATED : April 4, 2017
INVENTOR(S) : Harrison et al.

It is certified that error appears in the above-identified patent and that said Letters Patent is hereby corrected as shown below:

On the Title Page

Please amend the Related U.S. Application Data as follows:
-- (63) Continuation-in-part of application No. 14/612,089, filed on Feb. 2, 2015, now Patent No. 9,864,454, which is a continuation of Application No. 13/849,698, filed on March 25, 2013, now Patent No. 9,013,452 --.

Signed and Sealed this
Eighth Day of December, 2020

Andrei Iancu
*Director of the United States Patent and Trademark Office*